United States Patent
Liaw et al.

(10) Patent No.: US 6,378,536 B1
(45) Date of Patent: Apr. 30, 2002

(54) ULTRASONIC CLEANING DEVICE FAULT DETECTOR

(75) Inventors: Shen-Tai Liaw, Taipei; Chien-Rong Huang, Hsinchu, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/708,173

(22) Filed: Nov. 7, 2000

(51) Int. Cl.[7] .................................................. B08B 3/10
(52) U.S. Cl. ..................... 134/113; 134/902; 134/58 R; 134/184
(58) Field of Search .............................. 134/56 R, 57 R, 134/58 R, 184, 186, 113, 902

(56) References Cited

U.S. PATENT DOCUMENTS

| | | | |
|---|---|---|---|
| 4,099,417 A | * | 7/1978 | Schwartzman |
| 4,510,810 A | * | 4/1985 | Kanada et al. |
| 5,433,102 A | * | 7/1995 | Pedziwiatr |
| 5,533,402 A | * | 7/1996 | Sarvazyan et al. |
| 5,676,015 A | * | 10/1997 | Sheen et al. |
| 5,931,173 A | * | 8/1999 | Schiele |
| 6,138,698 A | * | 10/2000 | Tanaka et al. |
| 6,242,847 B1 | * | 6/2001 | Puskas |

FOREIGN PATENT DOCUMENTS

JP            4-56132        *   2/1992

* cited by examiner

Primary Examiner—Frankie L. Stinson
(74) Attorney, Agent, or Firm—Pro-Techtor International Services

(57) ABSTRACT

An ultrasonic cleaning device fault detector, comprising an ultrasonic wave converter, an amplifier, a band-pass filter, and an integrator. The ultrasonic wave converter operates at the same central frequency as the ultrasonic cleaning device and is able to sense the intensity of ultrasonic waves generated by the ultrasonic cleaning device and to produce an analog signal therefrom. The amplifier amplifies the analog signal generated by the ultrasonic wave converter. The band-pass filter filters out noise in the analog signal, eliminating electric noise and other external noise that are sensed by the ultrasonic wave converter. The integrator converts the analog signal cleaned in the band-pass filter into an electric voltage digital signal output, thereby indicating whether the vibrating device of the ultrasonic cleaning device is working properly.

2 Claims, 2 Drawing Sheets

ULTRASONIC CLEANING DEVICE FAULT DETECTOR

BACKGROUND OF THE INVENTION

1. Field of the Invention

The present invention relates to an ultrasonic cleaning device fault detector, particularly to an ultrasonic cleaning device fault detector which is suitable for use at producing semiconductors.

2. Description of Related Art

During the production of semiconductor wafers, the wafers or part of the apparatus used need cleaning. Cleaning is usually performed by ultrasonic waves. For this, ionized liquid is filled into a vessel with a vibrating device on a periphery thereof. The vibrating device generates ultrasonic waves, and the ionized liquid serves as a medium for the ultrasonic waves. Thus, after placing an object to be cleaned in the vessel, dirt of various kinds is removed from the object. However, if the vibrating device fails, e.g., if output thereof is too low or entirely absent, no effective cleaning is performed. Therefore a detector is required to monitor proper functioning of the vibrating device.

Conventionally, monitoring a cleaning device is performed by a detector sensing ultrasonic waves in the vessel, when the vibrating device is turned on. For detecting vibrations in the vessel, a mercury switch, a voltage detector or a special vibration-sensitive integrated circuit are used. However, all of these detector designs have the following shortcomings:

1. Installation is difficult: Since the detector needs to be fixed on the vessel, space has to be reserved for the detector when the vessel is designed. Otherwise, there is no way to install the detector on the vessel.
2. Interference by external noise. The detector not only senses waves in the vessel, but also electric noise and vibrations from other sources. Therefore, it is not possible to ascertain that vibrations inside the vessel have occurred.

SUMMARY OF THE INVENTION

It is an object of the present invention to provide an ultrasonic cleaning device fault detector which is not easily subjected to noise and which is able to recognize a defect of an ultrasonic cleaning device correctly.

Another object of the present invention is to provide an ultrasonic cleaning device fault detector which is easy to install and offers increased flexibility.

The present invention can be more fully understood by reference to the following description and accompanying drawings.

DETAILED DESCRIPTION OF THE PREFERRED EMBODIMENTS

Figure 1:
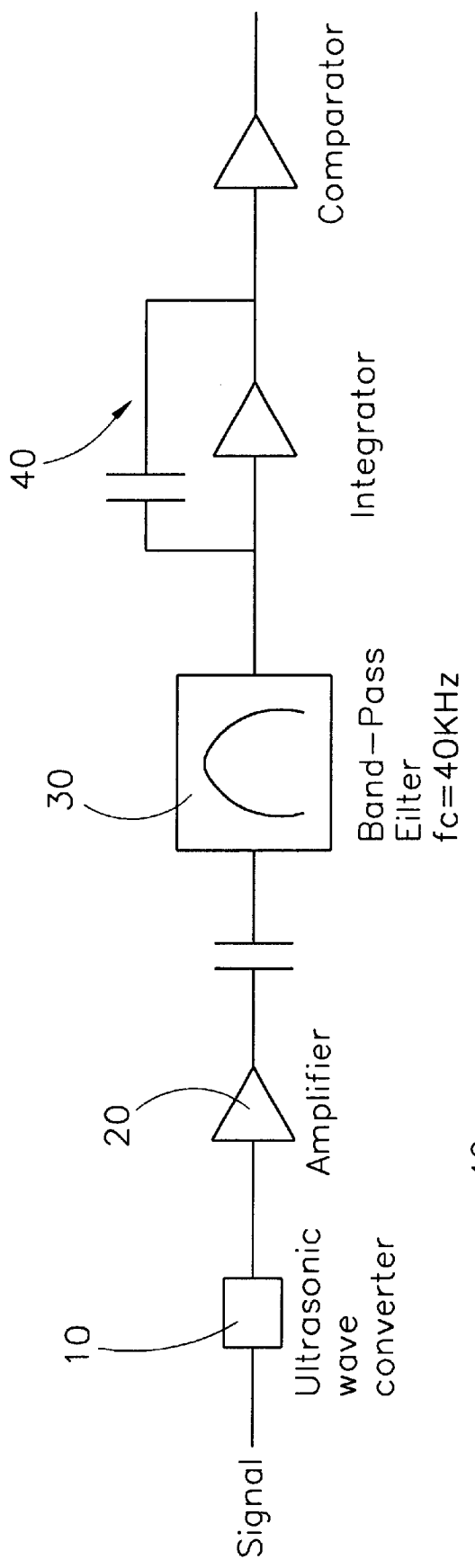
FIG. 1 is a schematic circuit diagram of the ultrasonic cleaning device fault detector of the present invention in the first embodiment.

As shown in FIG. 1, the ultrasonic cleaning device fault detector of the present invention is used in conjunction with an ultrasonic cleaning device. The ultrasonic cleaning device fault detector of the present invention in a first embodiment mainly comprises: an ultrasonic wave converter 10; an amplifier 20; a band-pass filter 30; and an integrator 40. The ultrasonic wave converter 10 operates at the same central frequency as the ultrasonic cleaning device and is able to sense the intensity of ultrasonic waves generated by the ultrasonic cleaning device and to produce an analog signal therefrom. The amplifier 20 amplifies the analog signal generated by the ultrasonic wave converter 10. The band-pass filter 30 filters out noise in the analog signal, eliminating electric noise and other external noise that are sensed by the ultrasonic wave converter 10. The integrator 40 converts the analog signal cleaned in the band-pass filter 30 into an electric voltage digital signal output, thereby indicating whether the vibrating device of the ultrasonic cleaning device is working properly.

Figure 2:
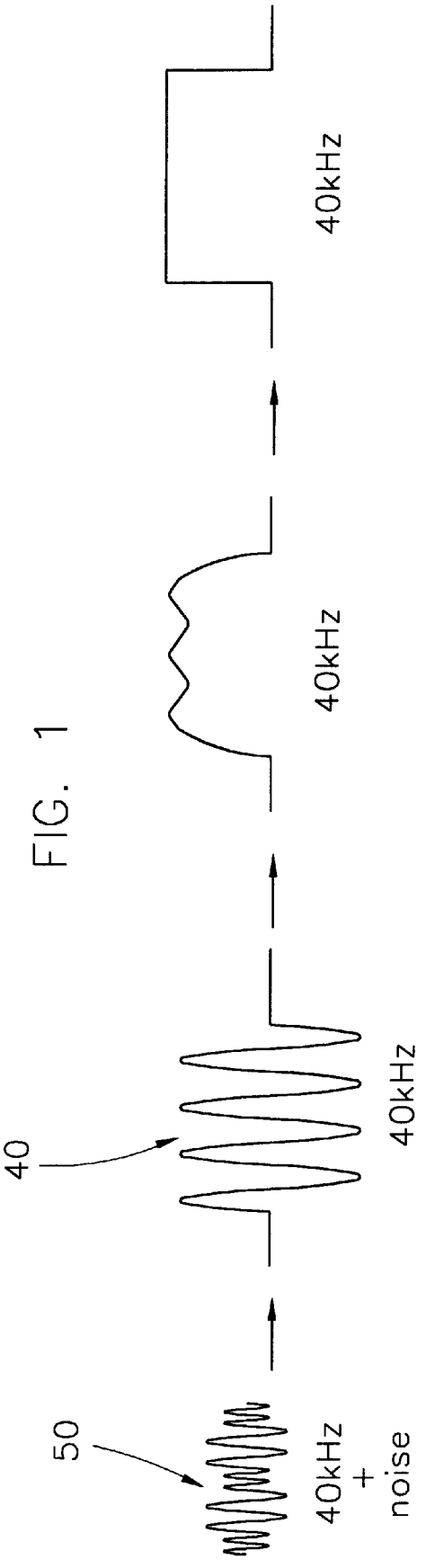
FIG. 2 is a schematic illustration of the signal detection performed by the present invention in the first embodiment.

Referring to FIG. 2, where a central frequency of 40 kHz is taken as an example, both the ultrasonic wave converter 10 and the ultrasonic cleaning device operate at a central frequency of 40 kHz. When the ultrasonic cleaning device is turned on, the ultrasonic wave converter 10 senses by radial detecting the intensity of ultrasonic waves generated by a vibrating device and produces an analog signal 50 therefrom which is centered around 40 kHz. The analog signal 50 is then amplified in the amplifier 20. Then electric noise and vibrations from other sources are eliminated in the band-pass filter 30, leaving only a signal component of the central frequency of 40 kHz. After this, the integrator 40, having received the signal with the central frequency of 40 kHz, generates an intensity output, thereby indicating whether the vibrating device of the ultrasonic cleaning device is generating appropriate vibrations. If the vibrating device of the ultrasonic cleaning device generates an output of insufficient frequency or fails completely, the signal frequency sensed by the ultrasonic wave converter 10 does not reach 40 kHz, and the integrator gives out a low-voltage signal, indicating that the ultrasonic cleaning device does not work properly.

Figure 3:
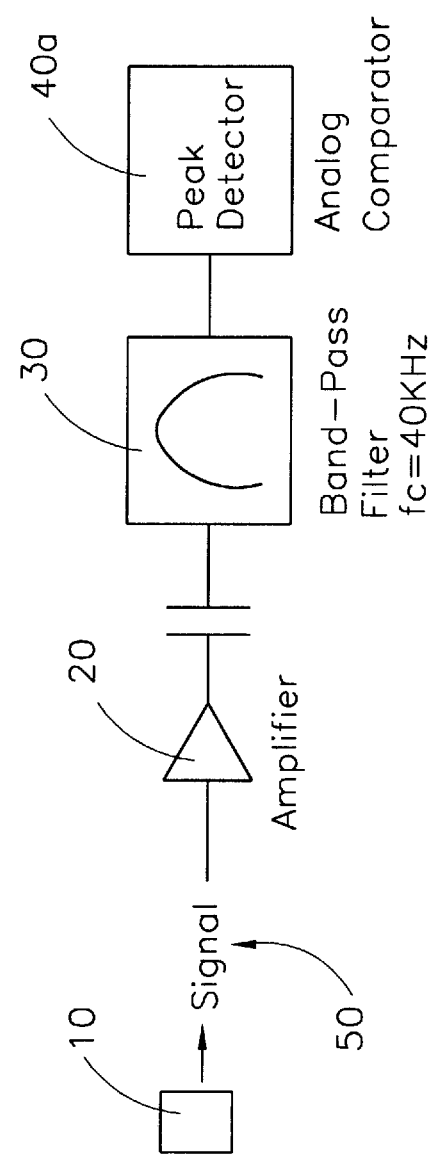
FIG. 3 is a schematic circuit diagram of the ultrasonic cleaning device fault detector of the present invention in the second embodiment.

FIG. 3 shows the present invention in a second embodiment. When the ultrasonic cleaning device employs a plurality of vibrating devices, the present invention is not just required to detect whether the vibrating devices generate appropriate sonic waves, but is also required to detect the intensity of the sonic waves generated by the ultrasonic cleaning device to decide whether the vibrating devices partly fail. Referring to FIG. 3, in the second embodiment of the present invention, a peak detector 40a is substituted for the integrator 40. The peak detector 40a distinguishes different amplitudes of the analog signal, judging whether the received amplitude of the analog signal is appropriate. Thus, when one of the vibrating devices of the ultrasonic cleaning device fails, the analog signal 50 produced by the ultrasonic wave converter 10 has a reduced amplitude, and the peak detector 40a detects that the amplitude of the analog signal 50 is below standard. Thus it is judged that the vibrating devices of the ultrasonic cleaning device partly have failed.

Figure 4:
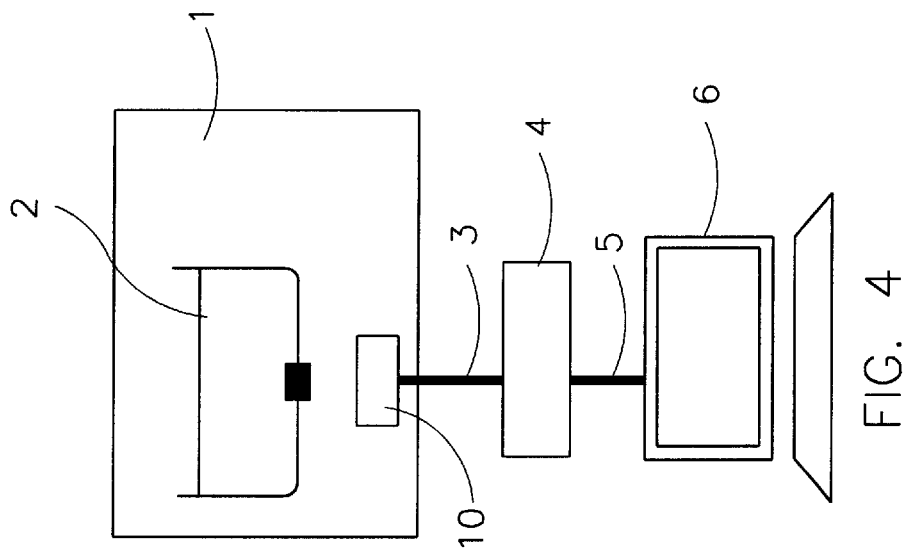
FIG. 4 is a schematic illustration of installing the present invention in an ultrasonic cleaning device.

Referring to FIG. 4, for installing the ultrasonic cleaning device fault detector of the present invention in the ultrasonic cleaning device, there is no need to place the ultrasonic wave converter 10 directly in a cleaning vessel of the ultrasonic cleaning device. With a small volume and little demand on space, the ultrasonic wave converter 10 allows to be installed at any place in a semiconductor preparation apparatus. Therefore, the ultrasonic cleaning device fault detector of the present invention offers great flexibility of installation. As shown in FIG. 4, for installing the present invention, the ultrasonic wave converter 10 is placed in the semiconductor preparation apparatus 1 close to the cleaning vessel 2. A cable 3 transmits the analog signal sensed by the ultrasonic wave converter 10 to a signal-processing circuit 4 comprising the amplifier 20, the band-pass filter 30 and the integrator 40. An interface 5 passes the judging signal generated by the signal-processing circuit 4 to a computer 6 for monitoring whether the ultrasonic cleaning device works properly.

The present invention does not require the ultrasonic wave converter 10 to be directly installed on the cleaning vessel. Due to a small volume and little demand on space, the ultrasonic wave converter 10 is accommodated at any place in a semiconductor preparation apparatus. Therefore, the present invention offers great flexibility of installation, leading to increased flexibility of the setup of the semiconductor preparation apparatus. Furthermore, the ultrasonic cleaning device fault detector of the present invention by the band-pass filter thereof filters out external noise, preventing that interference by external noise affects sensing precision. Effectiveness and precision of sensing are thus greatly enhanced.

While the invention has been described with reference to preferred embodiments thereof, it is to be understood that modifications or variations may be easily made without departing from the spirit of this invention which is defined by the appended claims.

What is claimed is:

1. An ultrasonic cleaning device fault detector for monitoring working of a vibrating device of an ultrasonic cleaning device, said ultrasonic cleaning device fault detector comprising:

an ultrasonic wave converter, operating with said vibrating device at a common central frequency, sensing ultrasonic waves generated by said vibrating device and producing therefrom an analog signal;

an amplifier, amplifying said analog signal generated by said ultrasonic wave converter;

a band-pass filter, operating with said vibrating device at a common central frequency, filtering out external noise in said analog signal; and an integrator, converting said analog signal from said ultrasonic wave converter into an electric voltage digital signal output, thereby indicating whether said vibrating device of said ultrasonic cleaning device is generating appropriate sonic waves.

2. An ultrasonic cleaning device fault detector for monitoring working of a plurality of vibrating devices of an ultrasonic cleaning device, said ultrasonic cleaning device fault detector comprising:

an ultrasonic wave converter, operating with said plurality of vibrating devices at a common central frequency, sensing ultrasonic waves generated by said vibrating device and producing therefrom an analog signal with an amplitude;

an amplifier, amplifying said analog signal generated by said ultrasonic wave converter;

a band-pass filter, operating with said plurality of vibrating devices at a common central frequency, filtering out external noise in said analog signal; and a peak detector, sensing said amplitude of said analog signal, comparing said amplitude of said analog signal with a standard value, thereby indicating whether said plurality of vibrating devices of said ultrasonic cleaning device partly fail.

* * * * *